United States Patent [19]
Dop et al.

[11] Patent Number: 5,185,779
[45] Date of Patent: Feb. 9, 1993

[54] CELLULAR ALARM BACKUP SYSTEM

[75] Inventors: Dennis B. Dop, Antioch; Michael G. Freitag, Palos Park, both of Ill.; Norbert W. Zawacki, 10740 S. LaCrosse, Oak Lawn, Ill. 60453

[73] Assignee: Norbert Zawacki, Oak Lawn, Ill.

[21] Appl. No.: 414,314

[22] Filed: Oct. 30, 1989

Related U.S. Application Data

[62] Division of Ser. No. 83,496, Aug. 5, 1987, Pat. No. 4,887,290.

[51] Int. Cl.$^5$ .................... H04M 11/04; H04Q 7/04
[52] U.S. Cl. ....................................... 379/33; 379/40; 379/50; 379/59
[58] Field of Search ............... 379/32, 33, 37-44, 379/46-51, 59, 60

[56] References Cited

U.S. PATENT DOCUMENTS

| 4,465,904 | 8/1984 | Gottsegen et al. | 379/42 |
| 4,718,079 | 1/1988 | Rabito | 379/39 |
| 4,731,810 | 3/1988 | Watkins | 379/40 |
| 4,868,859 | 9/1989 | Sheffer | 379/39 |

OTHER PUBLICATIONS

Stewart Crump, Jr., "AB1X: Landline Emulator for Cellular", *Personal Communications Technology*, Jun. 1986, pp. 39 and 42.

*Security*, May 1987; p. 18, "Cellular Communications Goes Off-Road to Transmit Alarms".
*Security Magazine*, "SDM News", May 1987.

*Primary Examiner*—James L. Dwyer
*Assistant Examiner*—Wing F. Chan
*Attorney, Agent, or Firm*—Y. Judd Azulay

[57] ABSTRACT

A cellular backup system is provided for a standard security alarm network, so that upon the inoperativeness of the telephone land line, automatic switch over to the cellular system is achieved, so that a digital communicator or teleophone tape dialer may still transmit its distress call to a central alarm station, via the cellular system. A line fault monitor is provided which automatically detects the outage of the land-based telephone system which, in turn, provides an output signal to a latching relay which causes the activation of a pair of switching relays to automatically switch the connection of the alarm communicator from the DB-8 cord of the land-based system to a cellular interface coupled to a conventional cellular transceive of a cellular system. The switching relays are latched in the state connecting the alarm communicator to the cellular backup system and held in such a state, regardless of the state of the land-based system, as long as a manual rest switch has not been used. The pair of switching relays are also used for coupling a standard land telephone handset also to the cellular system upon the outage of the land-based lines.

6 Claims, 5 Drawing Sheets

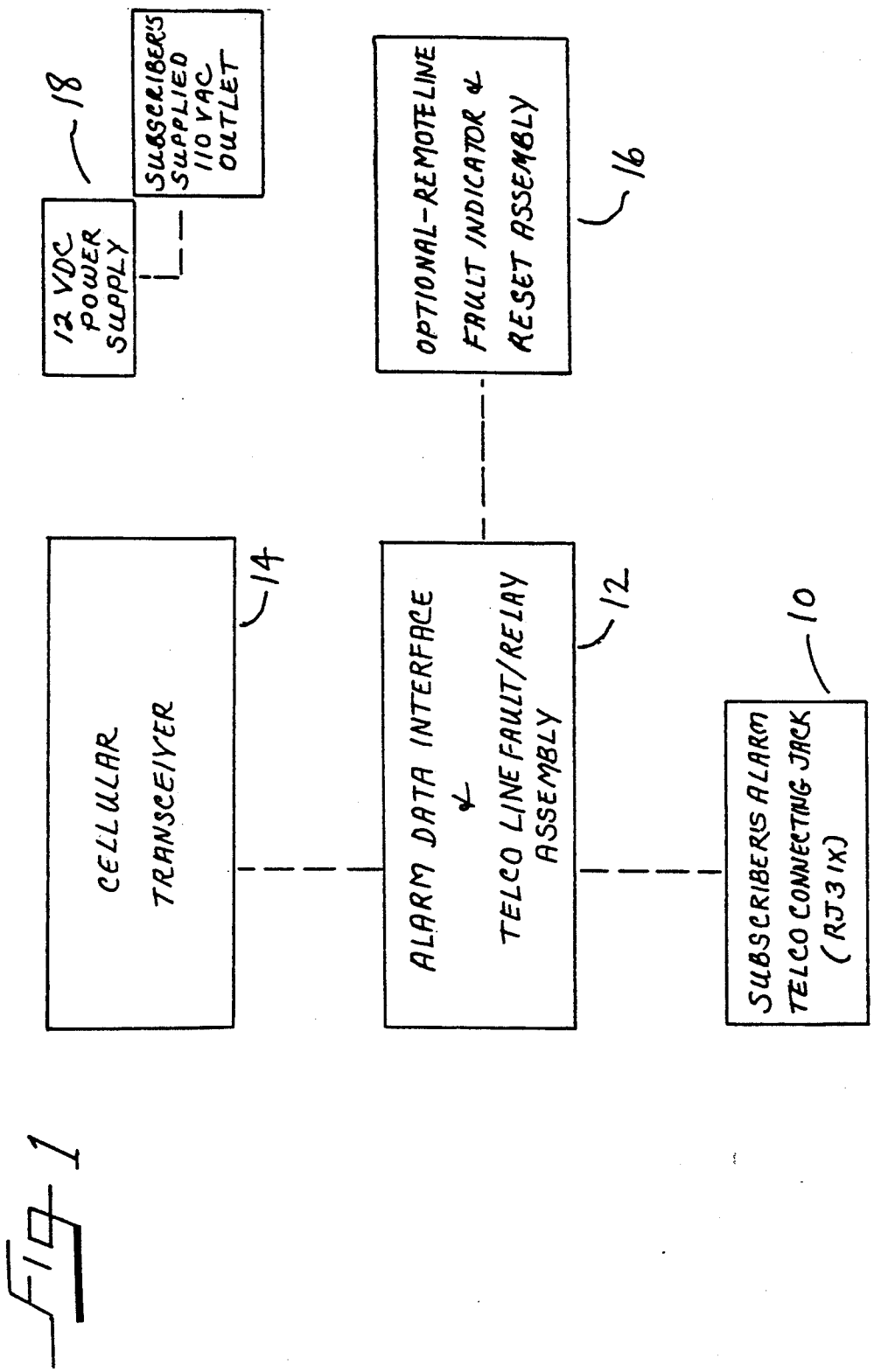

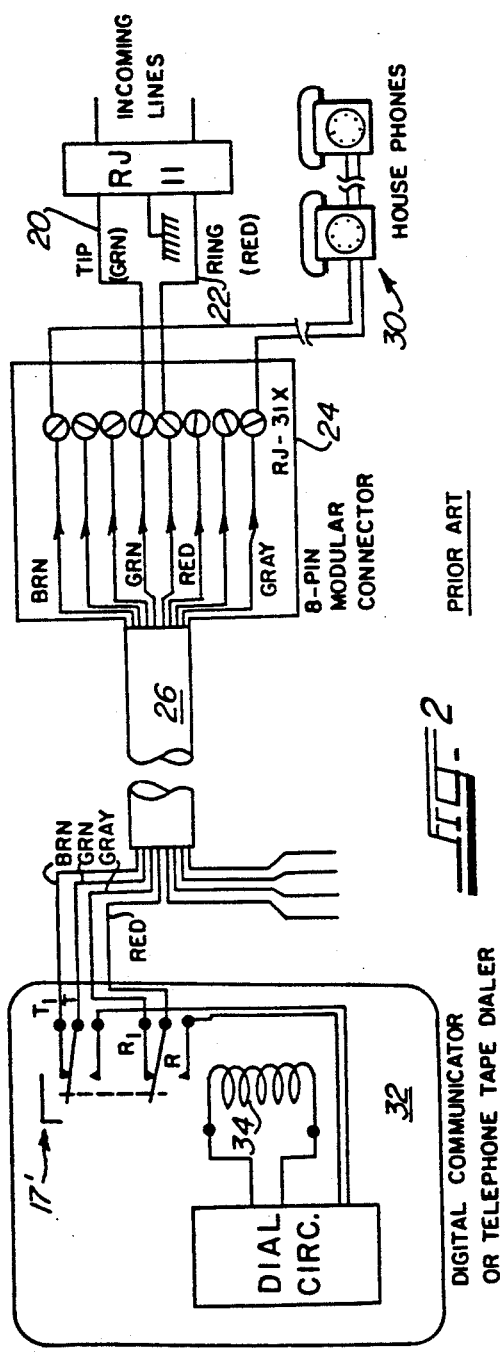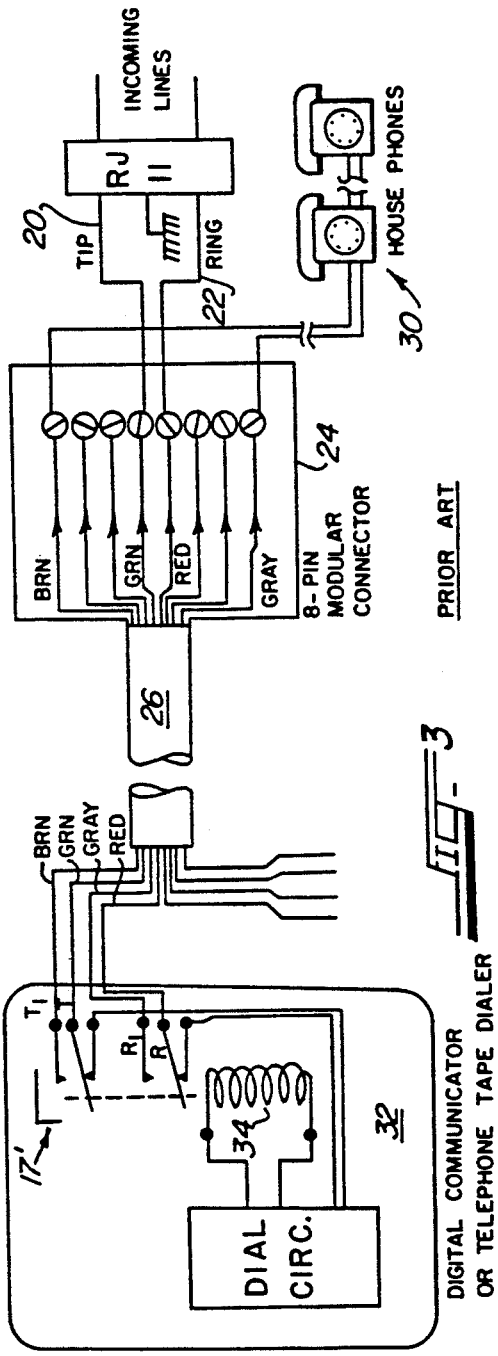

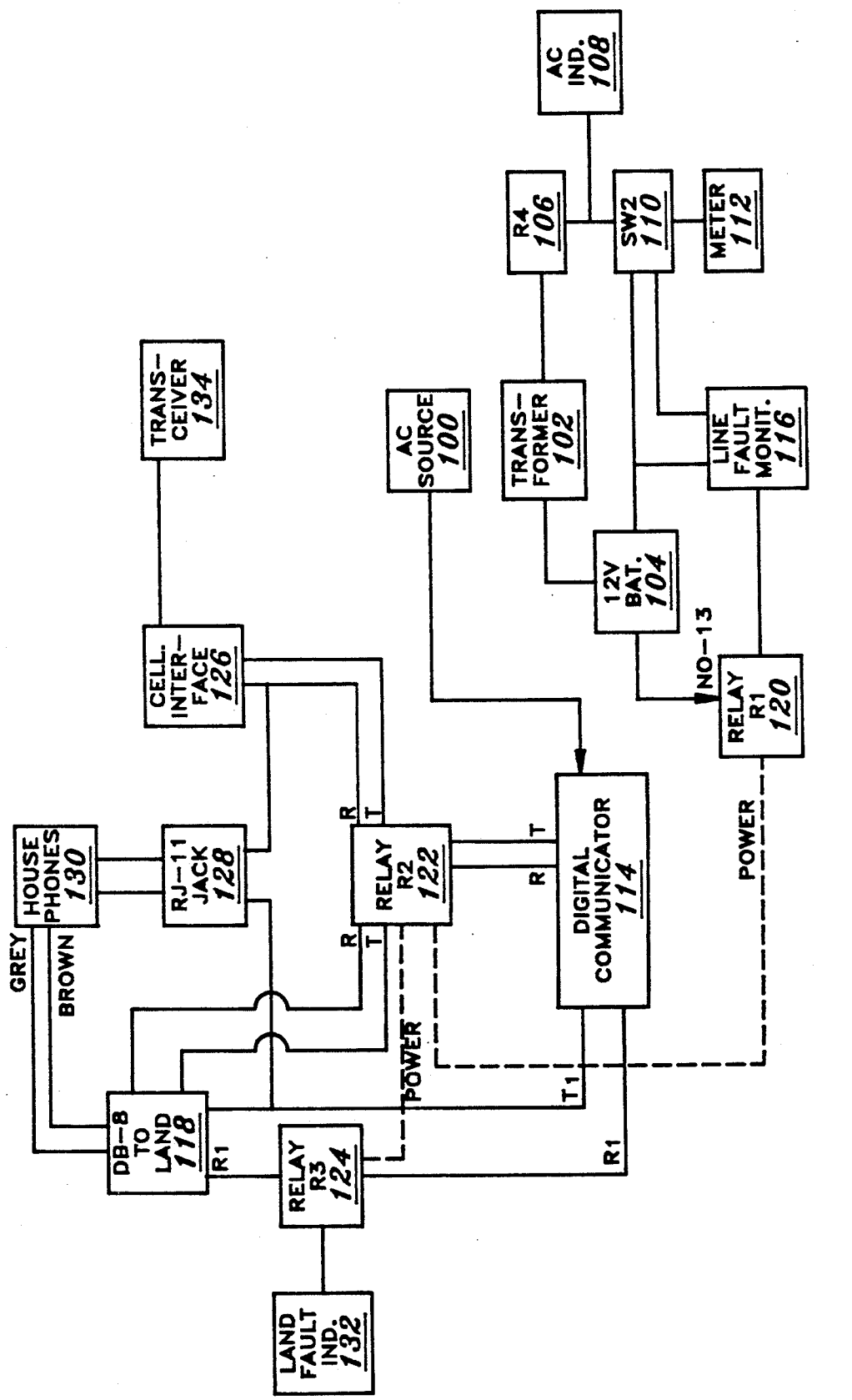

CELLULAR ALARM BACKUP SYSTEM

This is a divisional of co-pending application Ser. No. 07/083,496 filed on Aug. 5, 1987, now U.S. Pat. No. 4,887,290.

BACKGROUND OF THE INVENTION

The present invention is directed to a cellular backup for conventional security alarm systems which utilize a digital communicator or telephone tape dialer to call a central alarm station when an alarm condition is present in a home, office or the like. The digital communicator or telephone tape dialer will, upon receipt of an alarm signal, automatically dial the central alarm station which, in turn, will dispatch security personnel to the site and/or notify the local police department. The digital communicator or telephone tape dialer is coupled to an 8-lead line called a DB-8 cord, which, in turn, is coupled to an RJ-31X jack required by the telephone company for use with alarm systems. The digital communicator is, in the conventional system, interposed between the DB-8 cord and the land-based phone or phones on the site to be protected by the alarm system so that under normal, non-alarm conditions, the phones at the site may be used in their normal manner. Upon the detection of an alarm signal at any one of the plurality of zones monitored by the alarm control system, which signal is inputted to the appropriate inputs of the digital communicator or telephone tape dialer, the digital communicator or telephone tape dialer will automatically switch over and take control of the telephone system, and will send out a call over the land-based telephone line to the central alarm station, indicating the presence of an alarm signal, as well an any appropriate information such as the zone effected, and the link.

Conventional, prior art alarm systems incorporating a digital communicator or telephone tape dialer, however, suffer from the disadvantage that, if the land line were to be cut or become inoperative for whatever reason, the digital communicator or telephone tape dialer would not be able to send out the alarm call. Thus, absence of the land line would effectively render the site unprotected, since no outgoing call could be made, by which the digital communicator or telephone tape dialer effects its operation. Therefore, if the land line were inoperative the digital communicator or telephone tape dialer would be useless.

The present invention is directed to a backup system which automatically takes control upon the inoperativeness of the land line connected to the convention telephone system, so that the digital communicator or telephone tape dialer may, alternatively, transmit its message over the cellular network, independent of the land-based telephone line system, and thereby prevent any prolonged lapse of time that the site is left unprotected by the alarm system using land-based lines alone.

SUMMARY OF THE INVENTION

It is the primary objective of the present invention to provide a cellular backup for a security alarm system, so that upon the inoperativeness of the land line system, the distress telephone call to the central alarm station may be carried out via the cellular system.

It is another objective of the present invention to provide such a cellular backup system in combination with a digital communicator or tape dialer, so that the cellular backup system automatically takes over upon the inoperativeness of the land line system, and allows for the tape dialer or digital communicator to transmit the distress telephone call to the central alarm station.

It is yet another objective of the present invention to allow for a standard land telephone handset to be used over the cellular system upon the inoperativeness of the land-based telephone system, as long as the digital communicator or telephone tape dialer is not actuated by an alarm signal at any zone or zones at the site being protected.

It is still another objective of present invention to automatically latch the cellular backup system to the digital communicator or telephone tape dialer, or to a standard land telephone handset, as long as a manual reset button has not been actuated to return the system to the normal, land-based telephone connection, after the land-based system has been restored to its normal operations.

It is another objective of the present invention to provide a separate direct current source for powering the cellular backup system, which direct current source is continuously recharged by the AC source provided for the standard security alarm system.

Toward these and other ends, the present invention provides a relay for alternatively switching the connection of a digital communicator or a telephone tape dialer between the land-based telephone system, when the land-based system is operative, and the cellular backup system when the land-based system becomes inoperative, for whatever reason. The relay is automatically actuated by means of a line fault detection, which detects the presence of a cut or interruption in the land line system, or the inoperativeness thereof. Upon the switching over from the land line system to the cellular backup system, the connections between the digital communicator's line seizure relay and the appropriate wires of the DB-8 cord connecting the alarm system to the land-based system are opened, and are latched in the open state in order to prevent the interference of any land-based system's call from interfering with the cellular system, upon the return of the land-based system to its normal operating conditions. Such latching is provided via a latching relay which is coupled between a line fault monitor and a first relay that switches over between the cellular backup system and the main land line system.

There is also provided a second relay in conjunction with the first relay, which, upon the activation thereof by the detection of a fault in the land line by the line fault monitor, will disconnect the RING1 terminals of the DB-8 cord and the digital communicator, and will use such to provide an input to a fault indicator, such as a voice alarm, which indicates the inoperativeness of the land line system at that time.

According to the present invention, when the land line system is inoperative and the cellular backup system is operative, as long as the digital communicator or telephone tape dialer is not activated by the input of an alarm signal from a zone or zones protected by the security alarm system, a standard land telephone handset is automatically connected to the cellular interface coupled to the cellular transceiver, so that a regular home or land-based telephone handset may be used for making and receiving telephone calls over the cellular system, thereby bypassing the land-based system's downtime.

Also according to the present invention, the land telephone is coupled to the cellular system as long as the digital communicator or telephone tape dialer is not actuated. Upon the actuation of such, because of an alarm input signal, the land telephone is automatically disconnected from the cellular interface and rendered inactive, thereby allowing for the complete operation of the digital communicator's transmission via the cellular network.

The first relay is embodied by a double pole/double throw switch, in which the common terminals thereof are connected to the ring and tip terminals of the digital communicator or telephone tape dialer, respectively. The normally closed terminals thereof are connected to the ring and tip lines of the DB-8 cord coupling the digital communicator to the land line system through an RJ31 jack. The normally open terminals of the first relay are coupled to the ring and tip terminals of the cellular interface, coupled, in turn, to the cellular transceiver, thereby allowing for the switch over from the land line system to the cellular backup system in an automatic fashion. The latching relay is also a double pole/double throw switch, a common terminal of which is latched to a normally open terminal thereof upon the actuation of the latching relay via the detection by the line fault monitor of the outage of the land line system, this being accomplished because of the normally open terminal's connection to the power terminal of the line fault monitor, and because of the connection of the common terminal of the latching relay via a manually operated switch to the power terminal of the latching relay's coil. The line fault monitor monitors the status of the land line system via its ring and tip terminals, which are coupled to the ring and tip terminals of the DB-8 cord via the first relay. A second relay, which is also a double pole/double throw switch, is provided and is powered via the constant voltage source of the system, and directly from the power terminal of the first relay. This relay is used for indicating, on an external fault indicator, the presence or absence of the operativeness of the land line system and, by the opening of the normally closed connection between the common terminal thereof coupled to the RING1 terminal of the alarm communicator, and the normally closed terminal thereof coupled to the RING1 line of a DB-8 cord to render the regular home or land-based telephone handset(s) inoperative.

The power supply for the cellular backup system is provided by a 12-volt battery, which is continuously recharged by the AC source powering the standard security system itself, via a DC transformer. At any one time, the battery's state of charge may be gauged via a meter, which is carried out by the operation of a single pole/single throw switch, which disconnects the power terminal of the transformer to the power line of the DC battery, and closes a circuit for connecting the DC battery's power terminal to the meter. Another relay is also provided which is used as an AC indicator for indicating the status of the AC power source, and is used for actuating a voice alarm, or the like, upon the outage of the present invention's AC power source.

According to the present invention, a standard land telephone may be used over the cellular system upon the inoperativeness of the land-based system, as long as the digital communicator or telephone tape dialer is not activated by an alarm signal. This is achieved by coupling the normally open terminal of the first relay, which is connected to the ring terminal of the cellular interface, also to the RJ11 jack coupled to a standard telephone handset, and also by coupling the TIP1 terminal of the digital communicator or telephone tape dialer also to the appropriate terminal of the RJ11 jack. Therefore, in combination with the line seizure relay of the digital communicator or telephone tape dialer, as long as the digital communicator or telephone tape dialer is not activated, the line seizure relay of the alarm communicator provides a closed path between the T1 and T terminals thereof, which T1 terminal is also connected to the cellular interface, thereby providing a closed loop for the telephone handset via the RJ11 jack, and also because the ring terminal of the line seizure relay of the alarm communicator is also connected to the RJ11 jack. Upon the activation of the digital communicator or telephone tape dialer by the input of an alarm signal, the line seizure relay of the alarm communicator changes state, thereby open circuiting the connection between T1 and T terminals thereof, and thereby automatically disconnecting the telephone land-based handset connected through the RJ11 jack from the cellular network.

BRIEF DESCRIPTION OF THE DRAWINGS

The invention will be more readily understood with reference to the accompanying drawing, wherein:

FIG. 1 is a block diagram indicating the major components of an alarm system incorporating therein the cellular backup system of the present invention;

FIG. 2 is a schematic view of the prior art alarm system utilizing a digital communicator or telephone tape dialer, and shows the state of the digital communicator or telephone tape dialer in its nonactivated condition;

FIG. 3 is a schematic view of the conventional alarm system utilizing a digital communicator or telephone tape dialer of FIG. 2, showing the state of the digital communicator in its energized, alarm-sensing condition for transmitting the alarm call over the land-based telephone line system;

FIG. 7 is a functional block diagram of the alarm system incorporating the cellular backup system of the present invention.

DETAILED DESCRIPTION OF THE INVENTION

Figure 4:
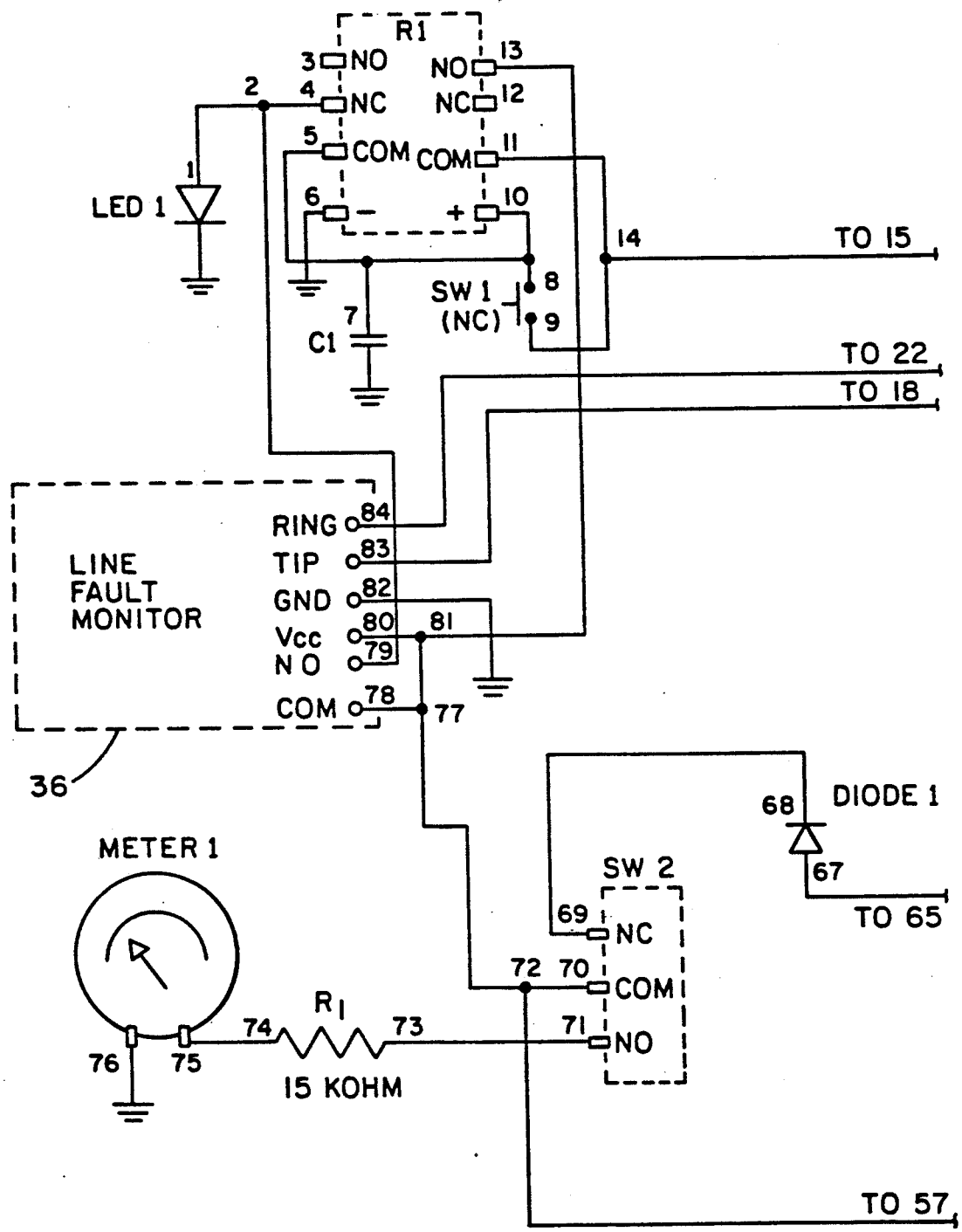
FIGS. 4 and 5 are schematic and wiring diagrams of part of the cellular backup alarm system of the present invention.

Referring now to the drawings in greater detail, the general overview of the alarm system, incorporating therein the cellular backup system of the invention, is shown in FIG. 1. Box 10 indicates the conventional alarm system in present use which utilizes a digital communicator or telephone tape dialer coupled to an RJ31X telephone jack via a DB-8 wire connector, with the alarm communicator also being connected to the land phones at the site being protected. Box 12 indicates the switching arrangement of the present invention for switching over from the conventional land-based line system to the cellular system, by the use of a line fault detector, relay assemblies, and a cellular interface, for connecting the digital commmunicator included in Box 10 to a conventional cellular transceiver shown in Box 14, so that when the telephone line fault detector in Box 12 detects a fault or cutting of the telephone land line, the digital communicator or telephone tape dialer included in Box 10 is automatically coupled to the cellular transceiver for transmitting the telephone call thereof via the cellular system. Block 16 indicates optional features that may be associated with the interface and relay assembly, while Box 18 shows the power supply for powering the cellular transceiver as well as the relays shown in Block 12. All of the above is explained in greater detail below.

Referring to FIGS. 2 and 3, there is shown the conventional prior art alarm system incorporating therein a digital communicator or telephone tape dialer for automatically dialing an alarm call to a central alarm station upon the detection of an alarm condition at a specific site. FIG. 2 shows the normal state of the alarm system when there are no alarm detection signals present. The incoming lines, over the tip line (green) 20 and the ring line (red) 22 are connected to the conventional RJ31X jack 24, which, in turn, are coupled to one end of the DB-8, eight pin modulator connector 26. Four of the eight leads of the DB-8 connector are utilized, while the remaining four are not. The four that are utilized are the brown, green, grey and red lines, and they are connected to the digital communicator or telephone tape dialer as shown in FIG. 2. The end of the brown wire is connected to terminal T1 (Tip 1) of the alarm communicator, the end of the green line is connected to the T terminal (Tip) of the alarm communicator, the end of the grey line is connected to the R1 (Ring 1) terminal of the alarm communicator, while the end of the red line is connected to the R (Ring) terminal of the alarm communicator. A double pole/double throw switch 17' is utilized for alternatively switchng over the connection of the house phones 30 to the alarm communicator 32 itself. Upon detection of an alarm signal, which signals are inputted to the digital communicator or telephone tape dialer, double pole/double throw switch 17' is energized by coil 34 to position the arms of the double pole/double throw switch such that the message/data lines of the alarm communicator are coupled to the DB-8 connector 26, in the manner shown in FIG. 3. The state of the alarm communicator shown in FIG. 3 completely bypasses the house phones 30, by disconnecting the terminals T1 and R1 with the common terminals T and R, to thereby disconnect the brown line and the grey line with the green and red lines, respectively, to thereby render the house phones inoperative. In the alarm state shown in FIG. 3, the alarm communicator message/data output terminals are closed with the common terminals tip and ring, to thereby allow for the digital communicator or telephone tape dialer to send out its preprogrammed telephone call to the central alarm station for further action.

As can be clearly seen in FIGS. 2 and 3, when the land line is cut, both the house phones 30 and the digital communicator/telephone tape dialer are rendered inoperative. Thus, upon the breakdown of the land-based telephone system, or the cutting of the line thereof at the site to be protected by the alarm system, the digital communicator or the telephone tape dialer is rendered ineffective, thereby leaving the area previously protected in an unprotected state.

The present invention provides a backup system by which the digital communicator or telephone tape dialer may, upon the inoperativeness of the telephone land line, dial its preselected and preprogrammed telephone number over the cellular system via a conventional telephone transceiver, so that the site to be protected is protected at all times, regardless of the condition of the land-based telephone line system.

Figures 5, 6:
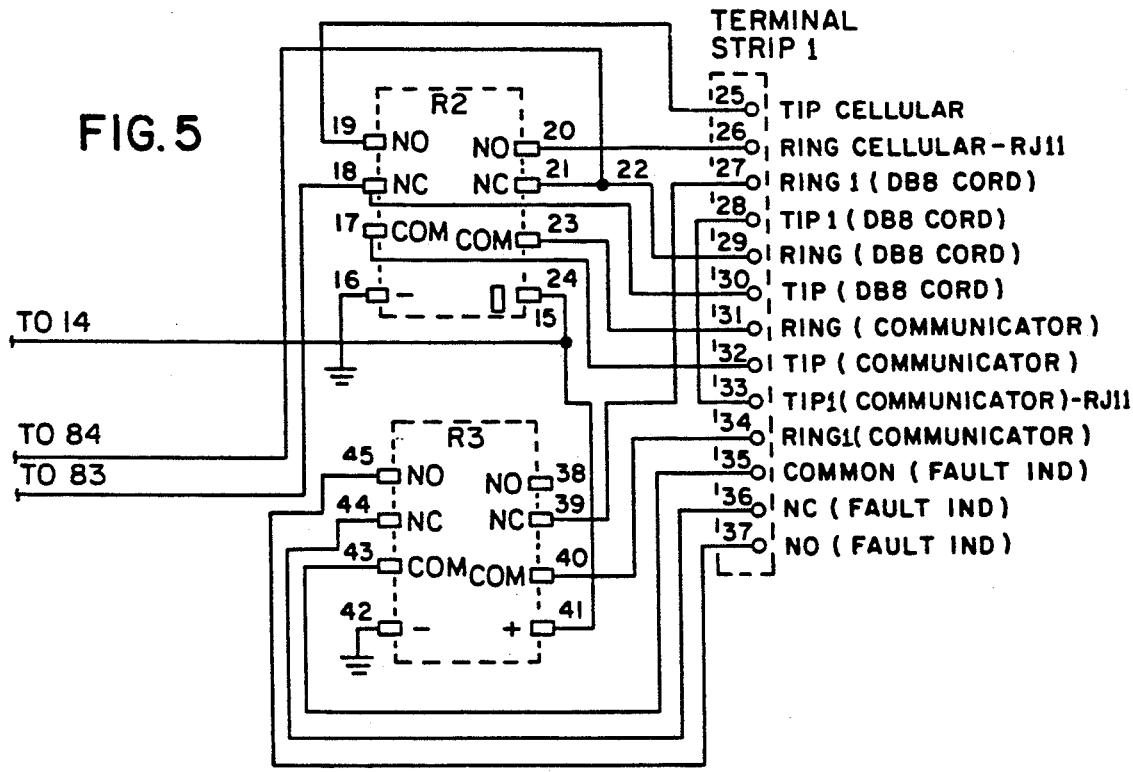
FIG. 6 is a schematic and wiring diagram of an additional portion of the cellular backup alarm system of the present invention.

FIGS. 4 through 6 show the relay system of the present invention, allowing for the automatic change over from the land-based telephone system to the cellular system upon the detection of the inoperativeness of the land-based system. Referring to FIG. 4, a line fault monitor 36 is provided, which line fault monitor may be that manufactured by Silent Knight Security Systems, Minneapolis, Minn., Model No. 7150, which is manufactured under the name of "Telephone Line Monitor Module." This telephone line monitor module will monitor incoming telephone lines and produce an output upon the detection of the phone line being inoperative. In the present invention, Model No. 7150 telephone line monitor module has been slightly modified in order to reduce the 50-second nominal delay incorporated therein, to the preferred time delay of the present invention of approximately 5 seconds, which has been accomplished by changing the timing circuitry thereof by replacing the 33 microfarad capacitor by a 2.2 microfarad capacitor. This ensures that, upon detection of a fault or cut in the line, an output status will be generated within approximately 5 seconds, rather than 50 seconds, so that the switch over to the cellular backup system of the present invention is carried out within that time span, in order to transmit the alarm telephone call to the central station. The Model No. 7150 telephone line monitor module includes seven terminals, six of which are utilized with the present invention, which six terminals are indicated by reference numerals 78 to 84 in FIG. 4, and are: common, normally open, Vcc, ground, tip and ring, respectively. The ring and tip terminals 83 and 84 are coupled to the ring line and the tip line of the DB-8 cord 26 as shown in FIGS. 2 and 3, which are, respectively, the red and green lines, via relay R2 shown in FIG. 5 and discussed in greater detail below. This connection provides for the coupling of the line fault monitor with the land line system, so that the cutting or faulting thereof will be detected in order to generate an output signal indicative thereof. This output signal generated by the line fault monitor is embodied by the shorting of terminal 78 (Com) with terminal 79 (normally open), so that power terminal Vcc is applied to the terminal 79, since terminal Vcc is shorted to terminal 78 via terminals 81 and 77. Thus, there is generated a fault line signal, which signal voltage is represented by Vcc, applied to terminal 79 (normally open). This output voltage Vcc is inputted to a relay R1 via terminals 2 and 4 thereof, terminal 4 being a normally closed terminal, and R1 being a double pole/double throw relay. Vcc is also applied to LED 1 to illuminate it to indicate that the land line has been lost, with LED 1 being appropriately mounted on the outside of the housing mounting the present invention. With the signal output Vcc applied to terminal 4 of R1, Vcc is connected to terminal 5 (Com), which, in turn, is connected to terminal 7 of capacitor C1 and is also shorted to terminal 10, which is the positive of the relay coil of R1. Thus, the relay coil is energized, thereby energizing the relay R1, to thereby tend to break the short between terminals 4 and 5. This, of course, would normally cause the relay to be de-energized, but the charge from capacitor C1 will keep the relay coil energized for a short time, which, in turn, will allow for the shorting of terminal 13 of R1 with the common terminal 11 thereof. Terminal 13 (normally open) is connected to Vcc of the line fault monitor 36 via terminal 81, while the common terminal 11 of the relay R1 is connected to the terminal 10 of relay R1 (positive terminal of the relay coil thereof) through a normally-closed push button switch SW1 associated with the terminals 8 and 9 of the line connecting the common terminal 11 to the positive terminal 10 of the relay coil. Thus, Vcc will be applied to the relay coil at terminal 10 thereof, and thus the relay R1 will stay energized to thereby provide a latching relay having a latching function that is independent of the voltage signal Vcc coming from the terminal 79 (normally open) of the line fault monitor 36. R1 is a latching relay since it becomes latched in its above-described state upon generation of the land line fault Output signal Vcc. The relay R1 will remain energized until the reset switch SW1 is manually pushed to thereby open circuit the connection between common terminal 11 and the relay coil terminal 10, to thereby interrupt Vcc to the coil, assuming that the land line has been repaired and/or activated.

Regarding the LED 1, it will remain lit only when the land line is not functioning, since it is coupled to terminal 79 (normally open) of the line fault monitor 36, which provides the output signal Vcc only when the land line is not functioning, as described above. The line fault monitor 36 and latching relay R1 provide the automatic change over or switching from the land based telephone system to the cellular backup system of the present invention, the line fault monitor detecting the time at which the change over or switching is to occur, while the latching relay R1 will hold such new state of the alarm system's coupling with the cellular system indefinitely until such time as the switch SW1 is manually reset to restore the alarm system to its normal operating status, after the land line system has been repaired.

The latching relay R1 is coupled to a relay R2, shown in FIG. 5, by the coupling of the common terminal 11 of relay R1 with the terminal 24 of relay R2, which terminal 24 is the positive terminal for the relay coil thereof. Thus, upon activation of the latching relay R1, relay R2 is also activated. Relay R2 is a double pole/double throw relay that includes common terminal 17, 23, normally closed terminals 18, 21 and normally open terminals 19 and 20. The common terminals 17 and 23 are connected to the tip and ring terminals of the alarm communicator, respectively, while the normally closed terminals 18 and 21 are connected to the tip and ring lines of the DB-8 cord, respectively. Thus, in the unenergized state of relay R2, the ring and tip lines of the DB-8 cord are connected to the ring and tip terminals of the digital communicator or telephone tape dialer. Upon actuation of relay R2 via the common terminal 11 of relay R1, the normally open terminals 19 and 20 are shorted to the common terminals 17 and 23. The normally open terminals 19 and 20 are connected to the ring and tip terminals of a cellular interface, such as that manufactured by Metrofone, Inc., disclosed in U.S. Pat. No. 4,658,096, which interfaces a standard telephone set to a conventional cellular transceiver. Upon the actuation of relay R2, the normally open terminals 19 and 20 are shorted to the common terminals 17 and 23, thereby coupling the tip and ring terminals of the digital communicator or telephone tape dialer to the tip and ring terminals of the cellular interface. It is noted that the normally open terminal 20 is also connected to an RJ11 telephone jack, for the reasons to be described below in greater detail. Simultaneously with the energization of the relay R2, the normally-closed terminals 18 and 21 are opened, thereby disconnecting the ring and tip lines of the DB-8 cord 26 with the ring and tip terminals of the digital communicator or telephone tape dialer (terminals 31, 32 along terminal strip 1), thereby rendering the house or site phones inoperative, regardless of whether or not the land line system is restored. Thus, a complete switch over to cellular is achieved upon the detection by the line fault monitor 36 of the inoperativeness of the land line system. This switch over will occur whether or not the digital communicator or telephone tape dialer is activated by the reception of an alarm signal. Thus, as will be described in greater detail later, the present invention also allows use of the cellular system by a house or site phone when the land system is inoperative, but only when the digital communicator or the telephone tape dialer is not activated.

The terminal strip 1, shown in FIG. 5, includes terminals 25 through 37, labeled appropriately as shown. The terminal strip interconnects appropriate terminals of relays R2 and R3 with the respective DB-8 cord, digital communicator or telephone tape dialer, and the terminals of the cellular interface system such as that disclosed in U.S. Pat. No. 4,658,096, as well as the RJ11 jack. As shown in FIG. 5, the terminal TIP 28, Tip 1 wire of the DB-8 cord, is shorted to the terminal 33 connected to the Tip 1 terminal of the digital communicator, as well as to the RJ11 jack. Terminal 33 of the terminal strip 1, also being connected to the RJ11 jack, provides for the use of a standard telephone handset when the land line system is inoperative, and the digital communicator or telephone tape dialer is not actuated. The relay R3 is also a double pole/double throw relay, and has common terminals 40, 43, connected to the terminals 34 and 35 of terminal strip 1 which, in turn, are coupled to the terminals RING1 of the digital communicator and a common of a fault indicator for indicating a fault on the line, respectively. Terminals 39 and 44 are normally closed terminals, and are connected to terminals 27 and 36, which in turn, are connected to the RING1 line of the DB-8 cord, and to normally closed fault indicator terminal, respectively. Terminals 38 and 45 of the relay R3 are normally open terminals, with the normally open terminal 45 being coupled to a normally open fault indicator, terminal 37. Terminal 41 is the positive terminal of the relay coil of relay R3, and it is coupled to the positive terminal of the relay coil of the relay R2. Thus, when the relay R2 is energized, relay R3 is simultaneously energized therewith, to short the normally open terminals 38 and 45 with the common terminals 40, 43. The relay R3, in its normal unactivated state, simply connects the RING1 line of the DB-8 cord with the RING1 terminal of the alarm communicator. During such a state, the fault indicator connected to terminal 36 will indicate that there is no land line outage of the telephone land system, and normal operations exist. When the relay R3 is actuated in accordance with the detection of a fault of the land telephone line, the connection between RING1 terminal of the DB-8 cord and the RING1 terminal of the alarm communicator is interrupted, while the normally opened terminal 37 of the terminal strip 1 is energized to indicate a fault condition, such as by a LED. In this state of the relays R2 and R3, and under the conditions where there is no alarm signal present, with the concomitant coupling of a standard telephone handset to the cellular interface via the RJ11 jack, the cellular system may be used by a standard telephone handset, thereby circumventing the outage of the land telephone line. This is achieved since the line seizure relay 17' of the alarm communicator is in the state shown in FIG. 2. Since T1 is coupled to the RJ11 jack via terminal 33, and since the R terminal is also coupled to the RJ11 jack via terminal 26, when R2 is energized and when there is no alarm condition present, the cellular interface is operatively coupled to a standard telephone handset via the RJ11 jack. When the land line is restored, the line fault monitor 36 will sense this on terminals 83 and 84 (tip and ring terminals, respectively), since these terminals are connected not only to the normally closed terminals 18 and 21 of relay R2, but also to terminals 29 and 30 of the terminal strip 1, which are, in turn, coupled to the ring and tip lines of the DB-8 cord. Upon such sensing, the short between normally open terminal 79 and common terminal 78 will be removed, resulting in the removal of Vcc from terminal 79, which will de-energize LED 1, and which, of course, will remove Vcc from normally closed terminal 4 of relay R1, so that when the switch SW1 has been pressed to reset the relay R1, thereby effectively opening the connection between terminal 10 and common terminal 11 of R1, relay R1 will remain in its original nonenergized state. If the switch SW1 has not been pressed, thereby still shorting the common terminal 11 to the positive terminal 10 of the relay coil of R1, then, of course, connection will still be provided to the cellular network via the interface thereof, so that both the digital alarm communicator and a standard telephone handset via the RJ11 jack will have switched to the cellular system. When the land line is restored, and the switch SW1 is pressed to de-energize relay R1, and thereby de-energize relays R2 and R3 also, the RJ11 jack will no longer function because the common terminal 23, which is coupled to terminal 31 of terminal strips 1, which, in turn, is coupled to the ring terminal of the alarm communicator, is no longer shorted to the normally open terminal 20, which is connected to the RJ11 jack and to the cellular interface via the terminal 26 of the terminal strip 1.

FIG. 6 shows the power supply circuitry of the invention, and includes a single pole/double throw (SPDT) relay R4 having a pair of common terminals 58, 63 shorted to each other and connected to terminal 48 of terminal strip 2 which, in turn, is coupled to common line of an AC indicator. R4 also includes normally open terminal 60 connected to terminal 47 of terminal strip 2 which, in turn, is coupled to normally opened terminal of the AC indicator, while a normally closed terminal 61 of R4 is connected to terminal 46 of terminal strip 2 which, in turn, is coupled to the normally closed terminal of the AC indicator. R4 also includes terminals 59 and 62, 59 being ground line, and terminal 62 being the power terminal. Terminal 62 is, in turn, connected to a LED indicated by LED 2 in FIG. 6, and also to a switch SW2 shown in FIG. 4, and specifically to the normally closed terminal 69 thereof. Terminal strip 2 also includes terminals 49 through 56, with the terminal 49 being connected to the positive line of a DC transformer, and terminal 50 being coupled to the ground of the DC transformer, terminal 51 being coupled to the power line of a DC battery, terminal 52 being coupled to the ground line thereof, terminal 54 being coupled to the ground line of the cellular transceiver, and terminal 56 being connected to the positive line of the cellular transceiver. The 12-volt battery supplied in the invention powers both the cellular transceiver via the connection between terminal 51 and terminal 56, as shown in FIG. 6, and also the relays R1 through R4. These relays are powered by coupling the terminal 51 to terminal 80 of the line fault monitor, which is Vcc shown in FIG. 4, as well as to the common terminal 78 thereof, in order to achieve the actuation of the relays upon the detection of the line fault monitor 36 of the inoperativeness of the land line system, in the manner described in detail above. Under normal operation, where the AC power supply is supplying power to the transformer and, therefore, to power elements of the present invention, terminal 62 of relays R4 will be energized to thereby cause a short between normally open terminal 60 and common terminal 58 and 63 thereof. Terminal 60 is, in turn, coupled to terminal 47 which, in turn, is coupled to a normally open AC indicator to indicate that the AC power line and associated DC transformer are operating normally. Upon failure of the AC line or the DC transformer, the voltage to terminal 62 is cut off, and normally closed terminal 61 is shorted to terminals 58 and 63, with the normally closed terminal 61 being coupled via the terminal 46, to the normally closed terminal of the AC indicator, to indicate a power failure.

In the normal operation of the device of the present invention, when AC power is supplied, the battery powering the powered components of the invention as well as the cellular transceiver thereof, is continuously recharged via the AC source. This is achieved by connecting the power line of the transformer, via terminal 49 of terminal strip 2, to a normally closed switch 69 of switch SW2 shown in FIG. 4. Interposed therebetween is diode 1, shown in FIG. 4, for preventing the battery voltage from feeding back and energizing the relay R4, as well as energizing LED 2, which LED 2 is utilized for indicating the presence of power from the transformer under normal operating conditions. As previously mentioned, since the power line of the battery is connected via terminal 51 to terminal 72 which is coupled to the common terminal 70 of switch SW2, under normal operating conditions the power transformer is coupled to the positive line of the battery, as well as to the common and Vcc terminals 78 and 80, respectively, of the line fault monitor 36, thereby not only powering the power components of the invention, but also recharging the battery in a continuous manner. Switch SW2 is a manual switch which is used for gauging the voltage of the battery at any particular point in time to see that it is properly charged. Switch SW2 has a normally open terminal 71 which, when shorted to the common in the second state of switch SW2 thereof, supplies power to METER1 via resistor R1 to thereby obtain a reading of the voltage of the battery.

FIG. 1 shows, in block diagram form, the operation of the alarm system incorporating the backup cellular system of the present invention. The AC source indicated in Block 100 is coupled in the conventional manner to the DC transformer 102 which, in turn, recharges the battery 104, which battery 104 is used to power the power components of the device of the invention. Relay R4 in Block 106 is used to power an AC indicator, indicative by Block 108, when AC power is down, the relay R4 also being coupled to switch SW2 shown in Block 110 for testing the voltage of the battery via the meter shown in Block 112. The 12-volt battery powers, as described above, the power components of the present invention, while the AC source powers the alarm communicator indicated in Block 114. The 12-volt battery is connected to the common and Vcc terminals of the line fault monitor indicated in Block 116, which line fault monitor is tied in with the conventional land system via the DB-8 cord indicated in Block 118. As described above, the line fault monitor 116 terminals ring and tip are connected to the ring and tip lines of the DB-8 cord directly, so that upon failure of the land line, the line fault monitor will generate the output signal indicative thereof as described above in detail. Upon such sensing of the inoperativeness of the land line, the latching relay R1 is activated via the Vcc signal of the line fault monitor, with the relay R1 shown in Block 120 thereafter powering relays R2 and R3, indicated by Blocks 122 and 124. The relay R2, shown in Block 122, is used for switching over from the land-based telephone system to the cellular system upon the outage of the land line, as described above in detail. The relay R2 alternatively connects the alarm communicator with the transceiver indicated by Block 126 or the standard land line via the DB-8 cord shown in Block 118. The relay R3, shown in Block 124, is used for indicating a fault indication of the land line thereof and for disconnecting the standard land telephone handset via the RING1 terminal of the alarm communicator and the RING1 line of the DB-8 cord, all of which have been described in detail above. When the alarm communicator has received an alarm signal in the conventional manner from a zone or zones of the conventional alarm circuitry associated therewith, the RING1 and ring terminals of the alarm communicator are open circuited, to thereby disconnect the standard telephone handset from the cellular system via the RJ11 jack, indicated by Block 128, thereby exclusively coupling the date output terminals of the alarm communicator to the transceiver directly. However, when there are no alarm signals present from any zone or zones of the alarm circuitry, with no input to the alarm communicator thereof, a standard telephone handset is coupled directly to the RJ11 jack via the relay R2 which, in turn, is coupled to the transceiver shown in Block 126. The hookup to the cellular backup system, whether the alarm communicator receives or does not receive an input alarm signal, remains stable and continuous until the switch SW1 is manually opened to thereby reset the latching relay R1 and reinitialize the entire power components of the invention.

While a specific embodiment of the invention has been shown and described, it is to be understood that numerous changes and modifications thereof may be made without departing from the scope, spirit and intent of the invention, as set out in the appended claims.

What is claimed is:

1. A backup system for a security alarm system, comprising:
   line fault detection means coupled to a land line system for determining the inoperativeness of a land line system at a site protected, said line fault detection means comprising a power terminal;
   power means coupled to said line fault detection means for powering said line fault detection means;
   transceiver means for sending and receiving signals;
   interface means coupled to said transceiver means comprising a ring terminal and a tip terminal;
   switch means comprising coupling means coupled to said interface means for coupling said switch means to an alarm communicator of a security alarm system, for switching over from the land line system upon the detection of land-line outage by said line fault detection means;
   said switch means comprising a first relay means, said first relay means having a pair of common terminals connectable to a ring terminal and a tip terminal of an alarm communicator, a pair of normally closed terminals capable of being coupled to a ring line and a tip line of a DB-8 cord connected to a land line system, and a pair of normally open terminals connected to said ring and tip terminals of said interface means;
   said switch means further comprising a second relay means having at least one common terminal connectable to a RING1 terminal of an alarm communicator, and at least one normally closed terminal connectable to a RING1 line of a DB-8 cord means connected to a land line system, whereby said second relay means may be used for indicating the inoperativeness of a land line system, and;
   jack means for a standard land telephone communications-type device, one said normally open terminal of said first relay means being coupled to said jack means, whereby said jack means, after also being coupled to a TIP1 terminal of an alarm communicator of a security system, upon the absence of a land line due to inoperativeness thereof, and also upon the nonactivation of an alarm communicator, is capable of coupling a standard land telephone communications-type device to said interface means for making an outgoing or receiving an incoming call via said transceiver.

2. The backup system according to claim 1, wherein said first switch means comprises a latching means for coupling an alarm communicator to said interface means after the land line system has been restored, said latching means comprising manual reset means for manually resetting said first switch means to its original state of coupling an alarm communicator to the land line system.

3. The backup system according to claim 1, wherein said jack means comprises a RJ11 jack.

4. A method of providing a cellular backup alarm transmission for a security alarm system, comprising:
   automatically switching over to a cellular transmission system upon the detection of the inoperativeness of a land line system; and
   making an outgoing call over the cellular telephone system;
   said step of automatically switching over comprising automatically disconnecting an alarm communicator provided at the site from the land line system and connecting the alarm communicator to a cellular transceiver interface unit coupled to a cellular transceiver;
   said step of making an outgoing call comprising sending out an alarm call to a central station via the alarm communicator to which the cellular system has been connected;
   said step of switching over further comprising coupling a standard land telephone communications-type device to the cellular transceiver interface unit coupled to a cellular transceiver for coupling the standard land telephone communications-type device to the cellular system after said step of detecting the inoperativeness of the land line, said step of coupling a standard land telephone communications-type device to the cellular system being terminated upon the initiation of transmission of a telephone call from the alarm communicator coupled to the cellular system during said step of switching over.

5. The method according to claim 4, wherein said step of coupling a standard land telephone communications-type device to the cellular transceiver interface unit is performed substantially simultaneously with said step of connecting the alarm communicator to the cellular transceiver interface unit.

6. A backup system for a security alarm system, comprising:
   line fault detection means coupled to a land line system for determining the inoperativeness of a land line system at a protected site;
   power means coupled to said line fault detection means for powering said line fault detection means;
   transceiver means for sending and receiving signals;
   interface means coupled to said transceiver means;
   switch means operatively coupled to said line fault detection means comprising first coupling means coupled to said interface means for coupling said interface means to an alarm communicator of a security alarm system, for switching over from a land line system upon the detection of land-line outage by said line fault detection means;
   a standard land telephone communications-type device;
   jack means for said standard land telephone communications-type device operatively coupled to said switch means, said switch means comprising second coupling means coupled to said jack means for coupling said standard land telephone communications-type device to said interface means upon the activation of said line fault detection means upon the absence of a land line due to inoperativeness thereof, and also upon the nonactivation of an alarm communicator, whereby said standard land telephone communications-type device may be used with said transceiver means.

* * * * *